UNITED STATES PATENT OFFICE.

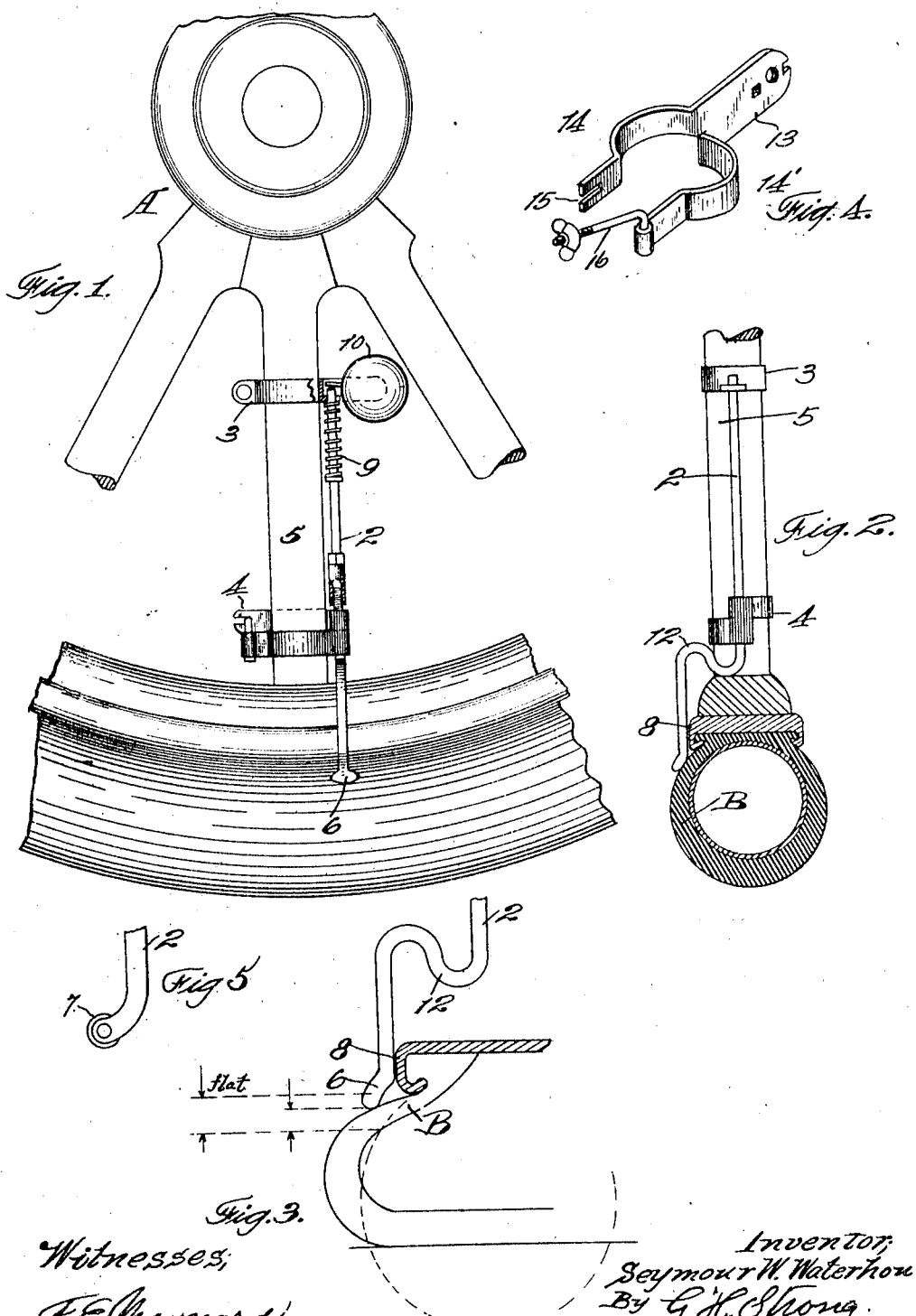

SEYMOUR W. WATERHOUSE, OF SAN JOSE, CALIFORNIA.

DETECTOR AND ALARM FOR PNEUMATIC TIRES.

1,096,408.

Specification of Letters Patent.

Patented May 12, 1914.

Application filed June 27, 1910. Serial No. 569,001.

*To all whom it may concern:*

Be it known that I, SEYMOUR W. WATERHOUSE, citizen of the United States, residing at San Jose, in the county of Santa Clara and State of California, have invented new and useful Improvements in Detectors and Alarms for Pneumatic Tires, of which the following is a specification.

This invention relates to deflation detectors and alarms for pneumatic tires.

Thousands of dollars are annually spent in the renewal of pneumatic tires which have been accidentally ruined solely by becoming deflated and then allowed to run flat, or partially so, whereby they are weakened by transverse distortion or cut by the rim which bears on them. Had the fact of low pressure or partial deflation been known or indicated at its inception to the driver of the vehicle, his attention would have been given to charging the tire, or if punctured, repairing it, before it would have been weakened or cut by running flat.

It is a special object of my invention to provide a detector and alarm adapted to be operated continuously by the alternate expansion and contraction of a pneumatic tire, whether the latter is partially or entirely deflated.

It is a general object of my invention to devise and design a means for detecting and indicating deflation of a tire adapted to be entirely mounted and carried by the wheel on which the tire is mounted; and to provide a device which is substantially universally adaptable and adjustable to several sizes of wheels, and which is interchangeable, simple, inexpensive and easily and quickly applied, without in any way whatsoever altering either the tire or wheel, or making any attachments to the vehicle body.

The invention consists of the parts and the construction and combination of parts as hereinafter more fully described and claimed, having reference to the accompanying drawings, in which—

Figure 1 is an edge view of the device applied to a wheel. Fig. 2 is a side view with the sound device omitted. Fig. 3 is a diagrammatic view of the action of the actuator by the tire. Fig. 4 is a perspective view of the clamp. Fig. 5 shows an anti-friction foot.

A represents a vehicle wheel and B the usual inflatable pneumatic tire to which the invention is applicable.

In the actual and successful embodiment of my invention, I employ a radially disposed rod or actuator 2, movably guided in appropriate upper and lower clamps 3 and 4, sufficiently flexible to be adjusted and secured to the spokes 5 of the vehicle wheel A. The lower end of the actuator 2 is formed with a laterally extending foot 6, or a roller 7, adapted to engage the top or inner side of the pneumatic tire B, relatively near the rim 8, so that as that portion of the tire on which the foot piece 6 rests is expanded or bulged sidewise and inwardly by contact with the ground at each revolution of the wheel, the rod 2 is pushed radially inward. As pressure on the ground becomes relieved at that point on the tire, a spring, as 9, pushes the rod out again correspondingly with the recovery of that section of the tire. Thus the rod 2 reciprocates correspondingly with the expansion and contraction or flattening action and recovery action of the tire in the travel of the latter over the ground. However, the rod 2 is so positioned that it will only be acted on by the tire within certain predetermined limits, as will be shortly explained, because it is this movement of the rod that gives the alarm. It will be manifest, however, that the amount of lengthwise movement of the rod will vary with the amount of deflation. That is, the flattening motion of the tire gradually increases as the deflation increases so that the rod 2 moves more and more at each revolution of the wheel. Having thus provided means sensitive to the differential expansion, or abnormal depression of the tire as when excessively loaded by the jolting of the vehicle, I combine with it a suitable form of sound producing mechanism, as shown at 10.

While a spring 9 may be employed to return the rod after each depression, it is preferred to allow the sounder to return it.

In order to adapt the device to any size wheel, I have found that the most inexpensive and simple way is to form in the rod 2 a compound curve or goose neck 12, so that it may be spread or contracted, more or less, by bending to accommodate it to different conditions.

An important feature of the device is to so shape the clamps 3—4 that they can be made of one piece and yet easily and quickly adjusted to various sizes of spokes, and this is accomplished by using flat stock of the requisite length to form a mount 13, Fig. 4, on one end and divided to form oppositely curved clamp arms 14 and 14', one of which is slotted at 15 to receive a swinging bolt 16, pivoted in the complementary arm 14'.

The flexibility of the arms will allow the clamp to be passed over the minor axis of the oval spoke, and when turned a quarter revolution the thick diameter of the spoke will be grasped by the curved arms, and the clamp tightened up by means of the bolts 16.

The device is very simple, inexpensive, is always within the plane of the tire and wheel, can be applied to any wheel, and it only sounds a repeating or continuous alarm when the tire is punctured or needs pumping up.

Having thus described my invention, what I claim and desire to secure by Letters-Patent, is—

In a tire alarm, the combination with a pneumatic tire and wheel spokes, of a pair of guide clamps secured to one of said spokes, a signal device carried by one of said clamps, a rod carried by, and slidably mounted in said clamps and lying within the plane of the spokes and operative when moved radially inward to a predetermined point to operate said signal, means for holding said rod normally out of operative position with the signal, said rod having an offset foot piece disposed in the path of the tire adjacent to the rim, and said foot piece arranged so that on the deflation and depression of the tire beyond a predetermined point, the foot piece is pushed radially of the wheel to reciprocate the rod and operate the signal; said signal device being disposed entirely within the plane of the wheel.

In testimony whereof I have hereunto set my hand in the presence of two subscribing witnesses.

SEYMOUR W. WATERHOUSE.

Witnesses:
CHARLES EDELMAN,
FREDERICK E. MAYNARD.